128,136

UNITED STATES PATENT OFFICE.

WILLIAM H. FORAN, OF BOSTON, MASSACHUSETTS.

IMPROVEMENT IN COMPOSITIONS FOR PAINT.

Specification forming part of Letters Patent No. 128,136, dated June 18, 1872.

Specification describing a Composite Paint for various purposes, invented by WILLIAM H. FORAN, of Boston, Suffolk county, Massachusetts.

The purpose of this invention is to produce a composition or paint for the preservation and protection of the roofs or outside walls of buildings; for farming tools, or for utensils or objects of any nature, whether of wood, tin, iron, or other materials which are exposed to the elements and liable to corrosion or decay.

In the compounding of my paint or composition I employ four gallons of coal-tar, one gallon of linseed-oil, and one gallon of the refuse resulting from the distillation of coal-tar oil, known to commerce as "dead-oil." I also add to the above one-half gallon of a moderately-thick solution of gum tragacanth and two pounds of soda ash dissolved in lime-water. These ingredients require no method or care in their mixing, but are incorporated indiscriminately, and the compound thus obtained may be thickened to the desired consistency according to its use by the addition of fine sand or ground slate. It may be colored by the addition of Lehigh or French yellow; or, if a light shade is desired, by the use of "whitewash putty," so called, or chalk, or both.

I do not confine myself to the arbitrary proportions herein given, as they may be varied to meet conditions without departing from the substance of my invention, as the degree of consistency, the shade of color, &c., of the compound would suggest themselves to any person of judgment, according to the requirements of the occasion.

The presence of the gum tragacanth imparts firmness and elasticity to the compound when dry, and I have found, by careful experiment, without knowing the chemical action, that rain-water passing over a roof protected by such compound is palatable to horses and other animals, and will be freely drank by them, when, under ordinary circumstances, they cannot be induced to drink it.

In addition to its preservative qualities, the above composition is fire-proof.

*Claim.*

I claim—
The composition, prepared in manner and of materials herein stated.

WM. H. FORAN.

Witnesses:
 FRED. CURTIS,
 W. E. BOARDMAN.